United States Patent [19]

Sydansk

[11] 4,304,301

[45] Dec. 8, 1981

[54] PROCESS FOR IMPROVING CONFORMANCE AND FLOW PROFILES IN A SUBTERRANEAN FORMATION

[75] Inventor: Robert D. Sydansk, Littleton, Colo.

[73] Assignee: Marathon Oil Company, Findlay, Ohio

[21] Appl. No.: 164,618

[22] Filed: Jun. 30, 1980

[51] Int. Cl.³ .......................................... E21B 33/138
[52] U.S. Cl. .................................... 166/292; 166/300
[58] Field of Search ............... 166/270, 273, 274, 275, 166/281, 292, 300; 405/263, 270

[56] References Cited

U.S. PATENT DOCUMENTS

| | | | |
|---|---|---|---|
| 2,001,350 | 5/1935 | Mills | 166/305 R X |
| 2,294,078 | 8/1942 | Dow et al. | 166/281 |
| 2,807,324 | 9/1957 | King et al. | 166/292 |
| 2,837,163 | 6/1958 | Romas et al. | 166/292 X |
| 3,593,793 | 7/1971 | Kelseaux | 166/300 X |
| 3,658,131 | 4/1972 | Biles | 166/292 |
| 3,718,189 | 2/1973 | Terry | 166/300 X |
| 3,837,400 | 9/1974 | Martin | 166/274 |
| 4,081,029 | 3/1978 | Holm | 166/292 X |
| 4,140,183 | 2/1979 | Holm | 166/292 |

Primary Examiner—Stephen J. Novosad
Assistant Examiner—George A. Suchfield
Attorney, Agent, or Firm—Jack L. Hummel

[57] ABSTRACT

An aqueous caustic solution and an aqueous solution containing a polyvalent cation dissolved therein are sequentially injected into the near well bore environment of a subterranean formation interposed by a hydrocarbon spacer. The spacer causes the two aqueous solutions to mix in the near well bore environment and an insoluble precipitate is formed which preferentially reduces the permeability of the relatively highly permeable zones in the near well bore environment thereby improving conformance and flow profiles of fluids subsequently injected into or produced from the formation.

18 Claims, 2 Drawing Figures

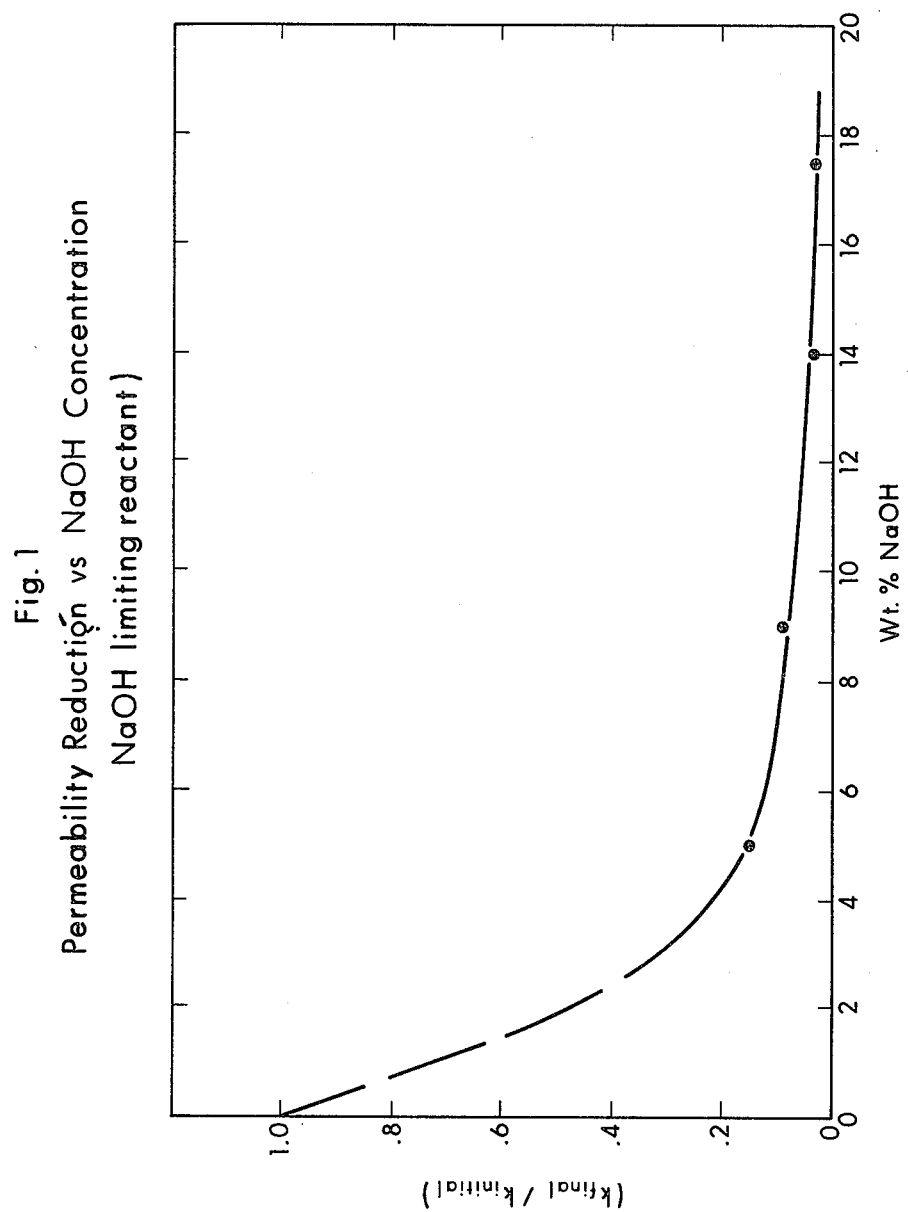

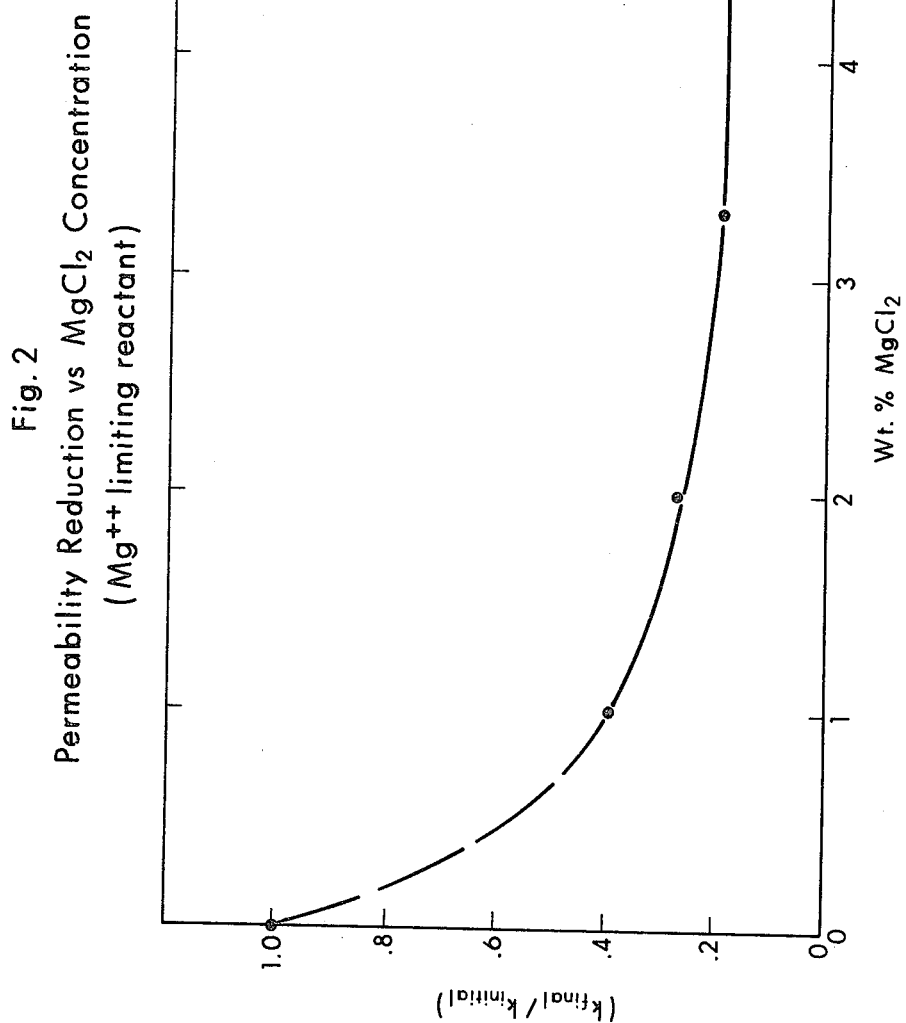

PROCESS FOR IMPROVING CONFORMANCE AND FLOW PROFILES IN A SUBTERRANEAN FORMATION

DESCRIPTION

1. Technical Field

The invention relates to a process for improving vertical conformance and flow profiles in subterranean formations, and more particularly, to a process for improving vertical conformance and flow profiles in the environment near a well bore penetrating a subterranean hydrocarbon-bearing formation.

2. Background Art

In general, poor vertical conformance of fluids injected into or produced from a subterranean formation occurs where the conformance exhibits a lack of vertical homogeneity. For example, while hydrocarbon-bearing subterranean formations exhibit relatively homogeneous horizontal properties near a well bore, horizontal stratification can occur at a distance from the well bore via cross-bedding between subterranean zones, beds, channels or vugs of varying permeabilities. Fluid injected into or produced from a well penetrating the formation tends to preferentially channel or finger into areas of relatively high permeability, thus resulting in extremely poor vertical conformance and flow profiles. Further exemplary, relatively highly permeable zones or beds may be vertically juxtaposed to zones or beds of relatively low permeability at the subterranean location where fluids are to be injected or produced via a well bore, i.e. the near well bore environment. Fluid injected into or produced from the subterranean hydrocarbon-bearing formation will preferentially flow through the zones or beds of relatively high permeability resulting in a relatively high residual hydrocarbon content in the remaining zones, beds, channels or vugs of relatively low permeability.

Several prior art processes have been proposed to alleviate such preferential channeling or fingering, and thus, improve conformance and injection and/or production flow profiles. High molecular weight organic polymers and cross-linking agents, such as polyvalent cations, have been sequentially injected into a subterranean hydrocarbon-bearing formation. These sequentially injected fluids predominantly finger or channel into areas of relatively high permeability wherein the high molecular weight organic polymers are cross linked and gelled. This gel plugs relatively highly permeable areas distant from the well bore and improves conformance and flow profiles of injected and/or produced fluids. Another process involves the sequential injection of orthosilicate, relatively soft water, and an aqueous slug containing calcium cations. The orthosilicate and calcium cations react at a location distant from the well bore and form a relatively insoluble precipitate. As these injection fluids tend to channel into areas of relatively high permeability, such precipitates tend to plug the highly permeable areas distant from the well bore and thus improve conformance and flow profiles. U.S. Pat. No. 3,658,131 to Biles discloses another process for selectively plugging highly permeable channels in a hydrocarbon-bearing formation by injecting a fresh water slug as a spacer for a subsequently injected aqueous solution containing 10-20 weight percent sodium silicate. The silicate will react with calcium cations present in formation water to form relatively insoluble precipitate. U.S. Pat. No. 3,837,400 to Martin discloses plugging permeable channels in a water flooded oil zone by injecting a sodium hydroxide solution which is isolated from connate water by a slug of water low in metallic ions. At a distance from the well bore, the sodium hydroxide penetrates the water isolation slug and reacts with various metallic ions in the connate water, such as magnesium and calcium, to form low solubility precipitates which will plug the channels. All of these prior art processes involve the use of an aqueous spacer between sequentially injected aqueous fluids. As these fluids preferentially channel or finger into the areas of relatively high permeability, the trailing fluid eventually penetrates the water spacer and reacts with the initially injected fluid or the formation water to form a plugging precipitate at a substantial distance from the well bore. These proposed prior art processes have not proved altogether satisfactory. The processes which involve the use of high molecular weight polymers or resins tend to be expensive and therefore cost ineffective, and none of these prior art processes have proved effective in improving vertical conformance and flow profiles of injected and/or produced fluids in the environment near a well bore. As radial flow of fluids injected into or produced from a well bore is predominantly influenced by the near well bore environment, failure of the prior art processes to improve vertical conformance and flow profiles in the near well bore environment has resulted in relatively poor vertical conformance and flow profiles of injected and/or produced fluids in the subterranean environment.

As hereinafter detailed, it has been discovered that these prior art processes which employ sequentially injected aqueous fluids fail to improve vertical conformance and flow profiles to any substantial degree due to the lack of mixing, and therefore, formation of precipitates in relatively highly permeable areas in the environment near the well bore penetrating the formation. For relatively short radial distances away from the wellbore e.g. about 2.5 centimeters to about 9 meters, subterranean formations exhibit relatively homogeneous horizontal characteristics. These prior art processes rely on fingering of sequentially injected aqueous fluids throughout a substantial distance within an area of relatively high permeability to allow the injected fluids to penetrate or disperse through the aqueous spacer slug and mix. As such, sequentially injected aqueous fluids separated by an aqueous spacer slug do not mix to any substantial degree in relatively highly permeable areas in the near well bore environment, and therefore do not improve conformance and flow profiles of fluids injected into or produced from such environment. Thus, a need exists for a process which results in the formation of large amounts of insoluble, plugging precipitates in relatively highly permeable zones in the near well bore environment to improve vertical conformance and flow profiles of injected or produced fluids.

DISCLOSURE OF INVENTION

The present invention provides a process for improving conformance and injection and production flow profiles in the near well bore environment of a subterranean formation. A hydrocarbon spacer is injected into the near well bore environment between a caustic aqueous solution and an aqueous solution containing polyvalent cations. The two aqueous solutions preferentially mix within relatively highly permeable areas of the near well bore environment and an insoluble precipitate is formed which preferentially reduces the permeability of the relatively highly permeable areas. Zone isolation can be employed to selectively reduce the permeability of a highly permeable subterranean zone within the near well bore environment. The process can also be practised without zone isolation. In addition to improving conformance and flow profiles in the near well bore environment, the process of the present invention improves vertical conformance and flow profiles of injected or produced fluids in the distant well bore environment.

BRIEF DESCRIPTION OF THE DRAWING

FIG. 1 is a graphical representation of the amount of permeability reduction obtained in the near well bore environment of a subterranean formation by the process of the present invention as a function of sodium hydroxide concentration, where sodium hydroxide is the limiting reactant; and FIG. 2 is a graphical representation of the amount of permeability reduction obtained in the near well bore environment of a subterranean formation by the process of the present invention as a function of magnesium chloride concentration, where magnesium chloride is the limiting reactant.

BEST MODE FOR CARRYING OUT THE INVENTION

The present invention relates to a process for improving the vertical conformance and flow profiles of fluid injected into or produced from the near well bore environment of a subterranean hydrocarbon-bearing formation. As utilized throughout this description, the term "near well bore" denotes the area of a subterranean formation surrounding a well bore penetrating the same which exhibits relatively homogeneous horizontal characteristics and wherein mixing between sequentially injected fluids separated by an aqueous spacer will not readily occur to any substantial degree. Such mixing is dependent upon, inter alia, the volume of the aqueous spacer, the characteristics of the formation (e.g. the number of pore channels present in the formation, the permeability of the formation, the degree of homogeneity of the formation, and the geometry of the pores and pore throats of the formation), the characteristics of each injected fluid (e.g. the diffusion characteristics of each fluid, the viscosities of each fluid, the concentrations of reactive species in each fluid, and the relative mobilities of each injected fluid), and the injection rates of each injected fluid. Given such dependency, the degree of mixing which will occur at a desired distance from a well bore penetrating a formation can be determined by the skilled artisan. As a general guide, the near well bore environment usually extends a radial distance into the formation of up to about 3 meters from the well bore, and may extend up to about 9 meters or more.

The process of the present invention comprises the sequential injection of two aqueous solutions, each of which contains separate dissolved species which will react upon mixing to produce a voluminous, relatively insoluble precipitate. More specifically, the process of the present invention involves the sequential injection of a first caustic, aqueous solution, a hydrocarbon spacer, and a second aqueous solution containing a dissolved polyvalent cation.

It has been unexpectedly discovered that the inclusion of a hydrocarbon spacer between a caustic, aqueous solution and a sequentially injected aqueous solution containing dissolved polyvalent cations causes mixing of the two aqueous solutions in the near well bore environment. Such mixing results in the formation of a precipitate in accordance with the following general reaction, wherein M represents the polyvalent cation:

$$M^{n+} + nOH^- \rightarrow M(OH)_n \qquad (1)$$

The resultant precipitate is a highly hydrated and dispersed, gel-like compound through which fluid flow is not completely prevented, but is greatly reduced. This precipitate is preferentially formed in, and hence, reduces permeability in the zones of relatively high permeability present in the near well bore environment resulting in improved conformance and flow profiles for fluid injected into or produced from the near well bore environment.

While it is not completely understood exactly why the process of the present invention results in formation of precipitates in the near well bore environment, it is believed that the hydrocarbon spacer traps a portion of the previously injected solution within the residual and immobile water phase in each pore of that portion of the formation into which the solution containing a dissolved reactive species has been injected. Subsequent injection of an aqueous solution containing another dissolved reactive species results in the reaction of polyvalent cations with caustic within each pore in accordance with general reaction (1).

The caustic utilized in one of the aqueous solutions may be any hydroxide ion generating compound such as, sodium hydroxide, potassium hydroxide, lithium hydroxide or ammonium hydroxide, although sodium hydroxide is preferred for purposes of the present invention. The hydrocarbon employed as the hydrocarbon spacer may be any hydrocarbon which is a liquid at formation conditions and which does not react to any substantial degree with caustic. Thus, carboxylic acids (e.g. acetic acid) are not suitable for use as hydrocarbon spacers in the present invention. The hydrocarbon can be an alkane, alkene, aromatic or a mixture thereof. Examples of hydrocarbons which may be used in the present invention are gasoline, kerosene, jet fuel, diesel fuel, and heating oil. Any polyvalent cation which can be dissolved in an aqueous solution, for example, calcium or magnesium, may be employed in the other aqueous solution. The polyvalent cation can be incorporated into the solution as a salt, such as, for example, magnesium chloride.

The relative amount of caustic and polyvalent cation employed is dictated by the stoichiometry of general reaction (1). Either the polyvalent cation or caustic can be limiting reactant, although for purposes of the present invention it is preferred to utilize caustic as the limiting reactant and hence employ a stoichiometric excess of polyvalent cations. The concentration of the limiting reactant in an aqueous solution is determined by the amount of precipitate desired and can vary from an extremely small concentration, e.g. 0.1 wt %, up to saturation level within the solution. The concentration of the non-limiting reactant in the aqueous solution is at least the stoichiometric amount required to completely react with the limiting reactant, with a stoichiometric excess preferably being employed.

In accordance with the present invention, the order in which the aqueous solutions are injected is not critical. The volume of the initially injected reactant injected into the near well bore environment is dictated by the depth of treatment desired. Once the depth is determined, the volume of the initially injected solution is approximately equal to or greater than the pore volume of the portion of the near well bore environment to be treated minus the volume of the residual oil in place. The volume of the initially injected reactant is critical since the injected volume dictates the depth of plugging and thus permeability reduction achieved thereby. The volume of hydrocarbon spacer injected is not critical, although preferably, the volume of hydrocarbon injected should be approximately the volume of initially injected solution.

By utilizing the process of the present invention, the permeability of the near well bore environment of a subterranean hydrocarbon-bearing formation can be predictably reduced over a relatively wide permeability range utilizing either caustic or polyvalent cation as the limiting reactant as illustrated in FIGS. 1 and 2. The process of the present invention is preferentially employed to improve vertical conformance and flow profiles in the near well bore environment of a subterranean hydrocarbon-bearing formation utilizing mechanical zone isolation, i.e. isolating selected relatively highly permeable zone(s) in a formation utilizing conventional packer assemblies and selectively treating these highly permeable zones. The following examples are illustrative of the application of the process of the present invention with zone isolation and are not to be construed as limiting the scope thereof.

EXAMPLE 1

A 7.6 cm×2.5 cm diameter linear, unfired, homogeneous Berea sandstone plug having an initial permeability of 460 md was sequentially injected with a 3 wt. % NaCl solution, a caustic solution, a water spacer, a polyvalent cation solution and finally a 3 wt. % NaCl solution. The injected fluids and the plug were maintained at 85° C. by a heat exchanger. The fluid permeability of the plug after this sequential injection treatment was measured and compared with the initial permeability. The results are set forth in Table 1.

TABLE 1

| Fluid | Pore Volumes Injected | Permeability (k) (md) | $k_{final}/k_{initial}$ |
|---|---|---|---|
| 3.0 wt. % NaCl | | 460 | |
| 4.0 wt. % NaOH in 3.0 wt. % NaCl | 0.33 | | |
| 3.0 wt. % NaCl | 0.25 | | |
| 2.0 wt. % CaCl$_2$ in 3.0 wt. % NaCl | 0.25 | | |
| 3.0 wt. % NaCl | | 440 | 0.96 |
| Second Sequence | | | |
| 4.0 wt. % NaOH in 3.0 wt. % NaCl | 0.33 | | |
| 3.0 wt. % NaCl | 0.17 | | |
| 2.0 wt. % CaCl$_2$ in 3.0 wt. % NaCl | 0.25 | | |
| 3.0 wt. % NaCl | | 480 | 1.09 |

The permeability reduction achieved by this treatment was not large enough ($k_{final}/k_{initial}$=0.96) to significantly improve vertical conformance and flow profiles of injected or produced fluids. As indicated in Table 1, the same plug was injected with a second sequence of caustic solution, aqueous spacer and polyvalent cation solution in an attempt to further reduce the permeability of the plug. The second sequence actually increased the permeability of the plug. This example illustrates the failure of prior art processes utilizing an aqueous spacer slug between two aqueous solutions containing reactive species to reduce the permeability of relatively highly permeable zones in the environment near a well bore.

EXAMPLE 2

A 7.6 cm×2.5 cm diameter linear, unfired, homogeneous Berea sandstone plug having an n-decane residual oil saturation was sequentially injected with a synthetic water flood injection brine, a 3 wt. % NaCl solution, a 30 wt. % NaOH solution, an n-decane spacer, a 10 wt. % MgCl$_2$ solution, and a synthetic water flood injection brine. The injected fluids and the plug were maintained at 85° C. by a heat exchanger. The synthetic water flood injection brine had a constituency concentration of 18,600 ppm NaCl, 3,820 ppm MgCl$_2$, 3,070 ppm Na$_2$SO$_4$ and 875 ppm CaCl$_2$. The fluid permeability of the plug after treatment was measured and compared with the initial permeability ($k_{final}/k_{initial}$). These results are set forth in Table 2.

TABLE 2

| Fluid | Pore Volume Injected | Mobility (md/cp) | Permeability (k) (md) | $k_{final}/k_{initial}$ |
|---|---|---|---|---|
| Syn. Injection Brine | 0-2.0 | 107 | 38.5 | 1.00 |
| 3.0% NaCl | 0-2.0 | 107 | 38.5 | 1.00 |
| 30.0% NaOH | 0-2.0 | 18.8 | | |
| n-decane | 0-2.0 | 19.6 | | |
| 10% MgCl$_2$ | 0-2.0 | 7.63 | | |
| | | 7.63 | | |
| Syn. Injection Brine | 0-8.0 | 13.8 | 4.94 | 0.13 |

This test was repeated utilizing a 25 wt. % MgCl$_2$ solution. The results of this second test are reported in Table 3.

TABLE 3

| Fluid | Pore Volume Injected | Mobility (md/cp) | Permeability (k) (md) | $k_{final}/k_{initial}$ |
|---|---|---|---|---|
| Syn. Injection Water | 0-10.0 | 13.0 | 4.62 | 1.00 |
| 3.0% NaCl | 0-5.5 | 13.4 | 4.81 | 1.04 |
| 30.0% NaOH | 0-3.0 | 1.75 | | |
| n-decane | 0-2.0 | 4.99 | | |
| 25% MgCl$_2$ | 0-1.1 | .161 | | |
| Syn. Injection Brine | 0-2.0 | .141 | .051 | .011 |

EXAMPLE 3

A 7.6 cm×2.5 cm diameter linear, unfired, homogeneous Berea sandstone plug was sequentially injected with a synthetic water flood injection brine, a 1 wt. % KCl solution, 34.4 wt. % KOH, an n-decane spacer, a 10 wt. % MgCl$_2$ solution, and a synthetic water flood injection brine. The injected fluid and plugs were maintained at 85° C. by a heat exchanger. The concentration of the constituents in the synthetic injection brine was identical to the constituency concentration of the brine utilized in Example 2. Fluid permeability after this treatment was measured and compared with the initial permeability. Results of this test are set forth in Table 4.

TABLE 4

| Fluid | Pore Volume Injected | Mobility (md/cp) | Permeability(k) (md) | $k_{final}/k_{initial}$ |
|---|---|---|---|---|
| Syn. Injection Water | 0–2.0 | 117 | 41.8 | 1.00 |
| 1.0% KCl | 0–2.0 | 122 | | |
| 34.4% KOH | 0–2.0 | 40.6 | | |
| n-decane | 0–1.5 | 19.4 | | |
| 10% MgCl$_2$ | 0–3.0 | 3.58 | | |
| Syn. Injection Brine | 0–1.0 | 6.49 | 2.32 | .055 |
| | 1.0–5.0 | 6.29 | 2.25 | .054 |

EXAMPLE 4

A 7.6 cm×2.5 cm diameter linear, unfired, homogeneous Berea sandstone plug having an initial permeability of 710 md was sequentially injected with a 3 wt. % NaCl solution, a 30 wt. % NaOH solution, an n-decane spacer, a 10 wt. % MgCl$_2$ solution, and a 3 wt. % NaCl solution. The injected fluids and the plug were maintained at 85° C. by a heat exchanger. Utilizing 2 pore volumes of the n-decane spacer, the fluid permeability measured after the sequential treatment was 92 md resulting in a permeability reduction of $k_{final}/k_{initial}=0.13$ in the highly permeable plug. Such significant permeability reduction in relatively highly permeable zone(s) in the near well bore environment will result in improved vertical conformance and flow profiles of injected or produced fluids.

This sequential fluid injection was repeated on a second 7.6 cm×2.5 cm diameter Berea plug having an initial permeability of 710 md utilizing 20 pore volumes of n-decane spacer. The injected fluids and the plug were maintained at 85° C. by a heat exchanger. The fluid permeability of the plug measured after completion of the repeated sequential injection was 71 md resulting in a permeability reduction of $k_{final}/k_{initial}=0.10$. These results indicate the permeability reduction achieved by the process of the present invention is independent of the volume of hydrocarbon spacer utilized. As previously mentioned, the amount of hydrocarbon spacer employed will be dictated in part by the amount of the first initially injected aqueous solution and the cost of the hydrocarbon.

EXAMPLE 5

This example illustrates the effects of repeated application of the process of the present invention on permeability reduction in zone(s) of relatively high permeability utilizing mechanical zone isolation. A homogeneous sandstone plug from an Oligocene aged reservoir having an initial permeability of 37 md was sequentially injected with a synthetic water flood injection brine, a 10 wt/% KCl solution, a 14 wt. % NaOH solution, a #2 diesel fuel spacer, 11 wt. % MgCl$_2$ in a synthetic water flood injection brine solution and a synthetic water flood injection brine. The injected fluids and the plug were maintained at 38° C. by a heat exchanger. The concentration of constituents in the synthetic injection brine was identical to the constituency concentration of the brine utilized in Example 2. The sequential injection was repeated and the fluid permeability was measured after each injection. The permeability reduction was calculated for each sequential injection and the results of this repeated application are reported in Table 5.

TABLE 5

| Condition | $k_{final}/k_{initial}$ | $k_{final}/k'_{initial}$ |
|---|---|---|
| After first treatment application | 0.19 | — |
| After second treatment application | 0.059 | 0.20 |

Note: $k'_i$ is permeability of the sandstone plug to the caustic flood of the second application. The caustic flood of second application increased to some extent the permeability of the plug due in part to settling of the precipitate and, thus, reduced the relative effect of the first treatment.

The results of this test indicate that the permeability reduction achieved by repeated selective application of the process of the present invention to zones of relatively high permeability is cumulative.

The aforedescribed examples indicate that the process of the present invention can be employed to achieve permeability reduction in relatively highly permeable zone(s) in the near well bore environment utilizing mechanical zone isolation. The process of the present invention can also be applied without zone isolation to preferentially and predominantly reduce permeability and aqueous mobility in relatively highly permeable subterranean zones which are vertically juxtaposed to zones of relatively low permeability in the near well bore environment. The following example is illustrative of the application of the process of the present invention without zone isolation, and is not to be construed as limiting the scope thereof.

EXAMPLE 6

Sequential injections were conducted in parallel utilizing 2.5 cm×2.5 cm diameter homogeneous sandstone plugs from an Oligocene aged reservoir, one plug having a relatively high permeability, the other a relatively low permeability. The plugs were sequentially injected with a synthetic water flood injection brine, a 25 wt. % NaCl solution, a 20 wt. % NaOH solution, a #2 diesel fuel spacer, 15 wt. % MgCl$_2$ solution, and a synthetic water flood injection brine. The injected fluids and both plugs were maintained at 85° C. by heat exchangers. The concentration of constituents in the synthetic injection brine was identical to the constituency concentration of the brine utilized in Example 2. The fluid permeability of each plug was measured after the sequential injection and at selected intervals up to 3 days thereafter. These subsequent measurements account for any settling of the precipitate which occurs after the formation thereof. The results of the sequential injections are set forth in Table 6.

TABLE 6

| Fluid | Plug (Permeability) | Pore Volumes Injected | Final Mobility (md/cp) | Final(k) Permeability (md) | $k_{final}/k_{initial}$ | $k_{high}/k_{low}$ |
|---|---|---|---|---|---|---|
| Syn. Injection Brine | High | 10.0 | 30.9 | 11.0 | 1.00 | 22.2 |
|  | Low | 15.0 | 1.39 | .496 | (1.00) |  |
| 25 wt. % NaCl | High | 5.0 | 20.6 |  |  | 22.8 |
|  | Low | 5.0 | .902 |  |  |  |
| 20 wt. % NaOH | High & Low | 0.58 | 8.7 |  |  |  |
| #2 Diesel | High | 3.0 | 15.5 |  |  |  |
|  | Low | 3.0 | .810 |  |  | 19.1 |
| 15 wt. % MgCl$_2$ | High & Low | 3.0 | .58 |  |  |  |
| Syn. Injection Brine | High & Low | 10.0 | 1.13 | .40 |  |  |
|  | High | 10.0 | 1.96 | .699 | .059 | 3.4 |
|  | Low | 10.0 | .580 | .207 | (.41) |  |
| Shut-in 17 Hrs. | High | 10.0 | 2.16 | .771 | .064 | 3.2 |
|  | Low | 10.0 | .675 | .241 | (.49) |  |
| Shut-in 24 Hrs. | High | 10.0 | 2.32 | .830 | .070 | 3.2 |
|  | Low | 10.0 | .737 | .263 | (.53) |  |
| Shut-in 72 Hrs. | High | 10.0 | 2.48 | .887 | .075 | 3.2 |
|  | Low | 10.0 | .789 | .281 | (.57) |  |

As these results indicate, the ratio ($k_{high}/k_{low}$) of the permeability at residual crude saturation of the high permeability plug (11.0 md) to the permeability of the low permeability plug (0.496) before treatment was 22.2 while after treatment in accordance with the present invention was unexpectedly 3.2. Thus, it can be appreciated that the permeability of the relatively high permeability plug was preferentially and predominantly reduced by application of the process of the present invention. As such, the ratio of the permeability of the high permeability plug to the permeability of the low permeability plug was significantly reduced, thus, improving the vertical conformance and flow profiles of subsequently injected and produced fluids.

It is important to note that the permeability reduction effects of the process of the present invention can be reversed by the application of a mineral acid, such as, hydrochloride acid. Ammonium chloride which is inexpensive and readily available can also be employed in solution to dissolve the precipitate.

The process can be applied to formations having widely varying temperatures and mineralogy, and is insensitive to the volume of hydrocarbon spacer injected. Also, multiple applications of the sequential injection of the present invention will further reduce the permeability of relatively highly permeable areas or zones and thus the aqueous mobility therethrough. And although the present invention has been described as a process involving the sequential injection of two aqueous solutions containing dissolved reactants interposed with a hydrocarbon spacer, the hydrocarbon spacer can be initially introduced into the near well bore environment, followed by caustic injection where the formation connate water contains polyvalent ions in a sufficient concentration to form large amounts of precipitate.

Although the present invention has been described as a process for treating and improving vertical conformance and flow profiles in the near well bore environment, the process of the present invention also improves vertical conformance and profiles of fluids injected into and produced from the well bore. As will be evident to the skilled artisan, vertical conformance and flow profiles for injected fluids will be improved to the greatest extent in distant well bore environment of the subterranean formation by application of the present invention in the near well bore environment where vertical fluid communication between zones of varying permeability in the distant well bore environment is limited. The converse applies for produced fluids.

While the foregoing preferred embodiment of the invention has been described and shown, it is understood that the alternatives and modifications, such as those suggested, and others may be made thereto, and fall within the scope of the invention.

I claim:

1. A process for improving vertical conformance and flow profiles of fluids injected into or produced from a subterranean formation having at least one zone of relatively high permeability and at least one zone of relatively low permeability, the formation being penetrated by a well bore in fluid communication therewith and having a near well bore environment which exhibits relatively homogeneous horizontal properties, the process comprising:

injecting into said near well bore environment via said well bore a caustic aqueous solution;

injecting into said near well bore environment via said well bore a polyvalent cation containing aqueous solution having a polyvalent cation dissolved therein, said polyvalent cation reacting with said caustic when said caustic aqueous solution mixes with said polyvalent cation containing aqueous solution to form an insoluble precipitate preferentially and predominantly within said at least one zone of relatively high permeability in said near well bore environment of the formation; and injecting into said near well bore environment via said well bore a hydrocarbon spacer between said caustic aqueous solution and said polyvalent cation containing aqueous solution, said hydrocarbon spacer causing delayed mixing of said solutions until said solutions are in said near well bore environment and said mixing resulting in formation of said insoluble precipitate which preferentially and predominantly reduces the permeability of said at least one zone of relatively high permeability in said near well bore environment.

2. The process of claim 1 wherein said caustic aqueous solution is an aqueous solution of sodium hydroxide.

3. The process of claim 2 wherein said polyvalent cation is magnesium and said insoluble precipitate is magnesium hydroxide.

4. The process of claim 3 wherein sodium hydroxide is the limiting reactant and a stoichiometric excess of magnesium is contained in said second aqueous solution.

5. The process of claim 1 wherein said caustic aqueous solution is injected into said near well bore environment prior to said polyvalent cation containing aqueous solution.

6. The process of claim 1 wherein the volume of said caustic aqueous solution which is injected into said near well bore environment is about equal to the pore volume of said near well bore environment minus the volume of the residual oil contained in said near well bore environment.

7. The process of claim 1 wherein said hydrocarbon spacer is selected from the group consisting of alkanes, alkenes, aromatics or mixtures thereof.

8. The process of claim 7 wherein said hydrocarbon spacer is diesel fuel.

9. The process of claim 1 wherein said subterranean formation is a subterranean hydrocarbon-bearing formation.

10. A process for improving vertical conformance and flow profiles of fluids injected into or produced from a subterranean formation having a zone of relatively high permeability and a vertically juxtaposed zone of relatively low permeability, the formation being penetrated by a well bore in fluid communication therewith and having a near well bore environment which exhibits relatively homogeneous horizontal properties, the process comprising:

injecting via said well bore into said zone of relatively high permeability in said near well bore environment a caustic aqueous solution;

injecting via said well bore into said zone of relatively high permeability in said near well bore environment a polyvalent cation containing aqueous solution having a polyvalent cation dissolved therein, said polyvalent cation reacting with said caustic when said caustic aqueous solution mixes with polyvalent cation containing aqueous solution to form an insoluble precipitate within said zone of relatively high permeability in said near well bore environment; and injecting via said well bore into said near well bore environment a hydrocarbon spacer between caustic aqueous solution and said polyvalent cation containing aqueous solution, said hydrocarbon spacer causing delayed mixing of said solutions until said solutions are in said zone of relatively high permeability in said near well bore environment and said mixing resulting in formation of said insoluble precipitate, said insoluble precipitate reducing the permeability of said zone of relatively high permeability in said near well bore environment and reducing the ratio of the permeability of said zone of relatively high permeability to the permeability of said zone of relatively low permeability.

11. The process of claim 10 wherein said caustic aqueous solution is an aqueous solution of sodium hydroxide.

12. The process of claim 11 wherein said polyvalent cation is magnesium and said insoluble precipitate is magnesium hydroxide.

13. The process of claim 12 wherein sodium hydroxide is the limiting reactant and a stoichiometric excess of magnesium is contained in said second aqueous solution.

14. The process of claim 10 wherein said caustic aqueous solution is injected into said zone of relatively high permeability in said near well bore environment prior to said polyvalent cation containing aqueous solution.

15. The process of claim 10 wherein the volume of said caustic aqueous solution which is injected into said zone of relatively high permeability in said near well bore environment is about equal to the pore volume of said zone of relatively high permeability in said near well bore environment minus the volume of residual oil contained in said zone of relatively high permeability in said near well bore environment.

16. The process of claim 10 wherein said hydrocarbon spacer is selected from the group consisting of alkanes, alkenes, aromatics or mixtures thereof.

17. The process of claim 16 wherein said hydrocarbon spacer is diesel fuel.

18. The process of claim 10 wherein said subterranean formation is a subterranean hydrocarbon-bearing formation.

* * * * *

UNITED STATES PATENT AND TRADEMARK OFFICE
CERTIFICATE OF CORRECTION

PATENT NO. : 4,304,301
DATED : December 8, 1981
INVENTOR(S) : Robert D. Sydansk

It is certified that error appears in the above-identified patent and that said Letters Patent are hereby corrected as shown below:

Column 7, following line 23, insert:

-- As indicated in Examples 2 and 3, use of a hydrocarbon spacer in lieu of a water spacer between a caustic aqueous solution and an aqueous solution containing a polyvalent cation unexpectedly results in the formation of insoluble precipitates in zones of relatively high permeability in the near well bore environment. These precipitates substantially improve vertical conformance and flow profiles of fluids produced from or injected into the near well bore environment.--.

Signed and Sealed this

Twenty-third Day of February 1982

[SEAL]

Attest:

GERALD J. MOSSINGHOFF

Attesting Officer    Commissioner of Patents and Trademarks